Figure 1:
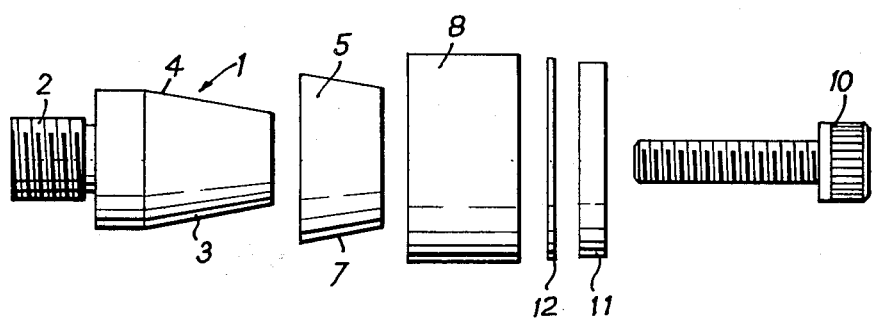

United States Patent [19]

Birchall

[11] 4,075,525
[45] Feb. 21, 1978

[54] PIEZOELECTRIC ACCELEROMETER TRANSDUCER

[76] Inventor: Donald Jack Birchall, c/o D. J. Birchall Ltd., Finchley Avenue, Industrial Estate, Mildenhall, Suffolk, England

[21] Appl. No.: 750,415

[22] Filed: Dec. 14, 1976

[30] Foreign Application Priority Data

Jan. 5, 1976 United Kingdom .................. 241/76

[51] Int. Cl.$^2$ ........................................ H01L 41/04
[52] U.S. Cl. ................................................ 310/329
[58] Field of Search ............... 310/328, 329, 358, 367, 310/369, 338; 73/516 R, 517 R, 517 AV

[56] References Cited

U.S. PATENT DOCUMENTS 2,216,966  10/1940  Swift ..................................... 310/338
3,727,084  4/1973   Epstein .................................. 310/329

Primary Examiner—Mark O. Budd
Attorney, Agent, or Firm—Wenderoth, Lind & Ponack

[57] ABSTRACT

A piezoelectric transducer for use as an accelerometer has a polarized piezoelectric element sandwiched between a spigot and a sleeve. The element is hollow and conical, or frusto-conical so that the sandwiching effect can be achieved by means of axial clamping, as by a screw. This avoids the use of solders or adhesives and thus allows high temperature operation.

6 Claims, 2 Drawing Figures

PIEZOELECTRIC ACCELEROMETER TRANSDUCER

The invention relates to a piezoelectric transfer for providing an electrical output in accordance with a mechanical stress to which the transducer is subjected. The invention finds particular application in accelerometer transducers for giving electrical outputs in accordance with acceleration.

Accelerometer transducers have been proposed in which there is a ceramic piezoelectric element sandwiched between two metal masses so that when the transducer is subjected to acceleration, inertial forces introduce strains in the ceramic element which produce output voltages by virtue of the piezoelectric effect. Such transducers find wide application for vibrational analysis etc.

One type of accelerometer in current use is the compressive disc accelromter in which a disc of piezoelectric material is sandwiched between the two metal masses and accelerative forces are applied axially. Such transducers have disadvantages because of spurious output and sensitivity changes arising from environmental changes. Another type of accelerometer is the annular shear accelerometer, which comprises a hollow cylinder of piezoelectric ceramic material mounted between an internal cylindrical spigot and an external cylindrical mass, shear strains being induced by axial accelerations.

Although annular shear accelerometers are generally less susceptible to environmental changes, a disadvantage is that the piezoelectric element is generally bonded to the masses by means of adhesive or solder. Thus, the transducer is capable of being used only at temperatures lower than the melting point of the adhesive or solder. In many applications, for example for the testing of gas turbine engines, higher temperature accelerometer transducers are required. An object of the invention is to provide a transducer which alleviates the above difficulties.

According to the invention there is provided a piezoelectric transducer comprising a hollow piezoelectric ceramic element having an axis, an internal conical surface and an external conical surface, the internal and external conical surfaces being inclined with respect to the axis in the same sense; the transducer further comprising a metal spigot; a metal sleeve; and a clamping arrangement for applying axial force to hold the element sandwiched between the spigot and the sleeve, the spigot and the sleeve having conical surfaces which make intimate surface contact with the internal and external conical surfaces of the element respectively. With this arrangement no adhesive is required to bond the element to the spigot and the sleeve.

Preferably, the ceramic is a hollow truncated cone of which both conical surfaces have the same angle of inclination to the axis. However, it is possible that the angles of inclination of the surfaces to the axis may be different.

Preferably, the clamping arrangement comprises a bolt which is threaded into the spigot and which draws a clamping plate down onto the sleeve. However, it is envisaged that a strong spring clamp may be employed as an alternative.

The piezoelectric property of the ceramic element is derived from polarisation which can be effected electrically befor shaping the element. The direction of polarisation will depend on the intended mode of vibration. For axial vibration axial polarisation is preferred. For torsional vibration circular polarisation may be employed. This may be effected by building the element from a number of appropriately polarised segments. For axial vibration, the transducer will operate largely by shear action on the element, although, depending on the inclination of the surfaces, there will be a compressional component.

Generally, the transducer will be used with the spigot firmly attached to the surface which is to be accelerated and the inertial reaction of the mass of the sleeve will cause the output potentials to be generated. However, the accelerometer transducer can be used in the opposite mode, with the sleeve attached to the surface to be accelerated, output being derived as a result of the consequent vibration of the internal spigot.

Preferably, the sleeve is made of a sintered tungsten/copper alloy, which has a high density and machines well. The spigot may be made of the same material, or perhaps of stainless steel 18/8. Another suitable material for the spigot is titanium.

Figure 2:
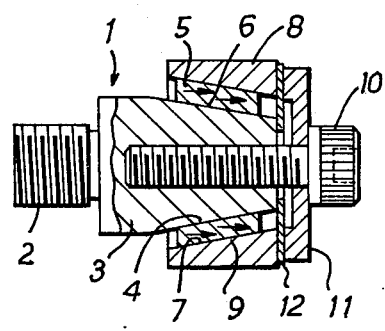

The invention will further be described with reference to the accompanying drawings, of which:

FIG. 1 is an exploded side elevation of a transducer according to the invention; and FIG. 2 is a cross-sectional side elevation of the assembled transducer.

Referring to the drawings, there is shown a transducer which comprises an internal spigot 1 of stainless steel having a threaded stud 2 whereby the transducer is mounted on a surface of which the acceleration is to be measured. The spigot comprises a body 3 integral with the stud 2 and having an external conical surface 4. The spigot is internally threaded.

A ceramic piezoelectric element of lead-zirconate-titanate material known as PZT5A is formed as a hollow truncated cone 5 having internal and external conical surfaces 6 and 7 which are parallel. Surface 6 is the same shape and size as the conical surface 4 of the spigot.

A tungsten/copper alloy sleeve 8 fits over the element 5 and has a conical internal surface 9 which is the same size and shape as the surface 7 of the element 5. The transducer is assembled by means of a bolt 10 which passes through a stainless steel clamping plate 11 and an insulating mica washer 12. The bolt 10 is threaded into the spigot and this constitutes a clamping arrangement for clamping the components of the transducer together by axial force. Thus, it will be seen that the element 4 is sandwiched between the spigot and the sleeve with the conical surfaces in initimate contact.

In use, the transducer is screwed by way of the stud 2 into a threaded recess in a body of which the vibration is to be analysed. Vibration of the body causes the piezoelectric element to generate voltages across its interior and exterior surfaces by virtue of the piezoelectric effect, the element 5 being piezoelectrically polarised axially in the direction indicated by the small arrows. The stresses in the element 5 are caused by the inertial reaction of the sleeve 8 and the potentials proportional to the acceleration are picked off by electrical contact (not shown) made with the sleeve 8 having reference to the potential of the spigot 1.

The bolt 10 puts a static pre-load on the element 5. Stresses arising from the acceleration are induced in the ceramic element, the characteristics of the response being determined in part by the relative compliance of the piezoelectric assembly and the bolt 10, which is of steel. The stresses in the element 5 are part shear and part compressive.

With the material PZT5A as described, the upper temperature limit of operation is governed by the piezoelectric Curie point of 380° C. However, other piezoelectric ceramics may be used, such as lead metaniobate $Pb\ Nb_2\ O_6$, where the Curie point is 570° C.

It will be appreciated that transducers having conical piezoelectric ceramic elements as described above may be used, in accordance with the invention, for other applications, such as force or pressure transducers, for example.

I claim:

1. A piezoelectric transducer comprising a hollow piezoelectric ceramic element having an axis, an internal conical surface and an external conical surface, the internal and external conical surfaces being inclined with respect to the axis in the same sense; the transducer further comprising a metal spigot; a metal sleeve; and a clamping arrangement for applying axial force to hold the element sandwiched between the spigot and the sleeve, the spigot and the sleeve having conical surfaces which make intimate surface contact with the internal and external conical surfaces of the element respectively.

2. A piezoelectric transducer as claimed in claim 1 wherein the ceramic element is a hollow truncated cone of which both conical surfaces have the same angle of inclination to the axis.

3. A piezoelectric transducer as claimed in claim 1 wherein the clamping arrangement comprises a bolt which is threaded into the spigot and which draws a clamping plate down onto the sleeve.

4. A piezoelectric transducer as claimed in claim 1 wherein at least the sleeve is made of sintered tungsten/copper alloy.

5. A piezoelectric transducer as claimed in claim 1 wherein at least the spigot is made of stainless steel.

6. A piezoelectric transducer as claimed in claim 1 wherein the piezoelectric ceramic element is axially polarised.

* * * * *